(12) United States Patent
Pederson et al.

(10) Patent No.: US 7,762,077 B2
(45) Date of Patent: Jul. 27, 2010

(54) SINGLE-STAGE HYPERSONIC VEHICLE FEATURING ADVANCED SWIRL COMBUSTION

(75) Inventors: Robert J. Pederson, Thousand Oaks, CA (US); Stephen N. Schmotolocha, Thousand Oaks, CA (US); William W. Follett, Calabasas, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 694 days.

(21) Appl. No.: 11/633,836

(22) Filed: Dec. 5, 2006

(65) Prior Publication Data

US 2008/0283677 A1 Nov. 20, 2008

(51) Int. Cl.
*F02K 7/08* (2006.01)

(52) U.S. Cl. .......................... 60/767; 60/768

(58) Field of Classification Search ............. 60/757, 60/758, 767, 768
See application file for complete search history.

(56) References Cited

U.S. PATENT DOCUMENTS

| | | | |
|---|---|---|---|
| 2,605,608 A | 8/1952 | Barclay, Jr. | |
| 2,605,611 A | 8/1952 | Wosika | |
| 2,720,754 A | 10/1955 | Francois | |
| 2,773,350 A | 12/1956 | Barrett et al. | |
| 2,828,603 A | 4/1958 | Laucher | |
| 2,828,609 A | 4/1958 | Ogilvie | |
| 2,833,115 A | 5/1958 | Clarke et al. | |
| 3,092,964 A | 6/1963 | Martin et al. | |
| 3,103,102 A | 9/1963 | Sargent et al. | |
| 3,161,379 A | 12/1964 | Lane | |
| 3,324,660 A | 6/1967 | Lane et al. | |
| 3,576,384 A | 4/1971 | Peczeli et al. | |
| 3,701,255 A | 10/1972 | Markowski | |
| 3,901,028 A | 8/1975 | Leingang | |
| 3,925,002 A | 12/1975 | Verdouw | |
| 3,977,353 A | 8/1976 | Toyama | |
| 4,073,138 A | 2/1978 | Beichel | |
| 4,185,457 A | 1/1980 | Parker et al. | |
| 4,220,001 A | 9/1980 | Beichel | |

(Continued)

FOREIGN PATENT DOCUMENTS

GB 754141 8/1956

(Continued)

*Primary Examiner*—Michael Cuff
*Assistant Examiner*—Phutthiwat Wongwian
(74) *Attorney, Agent, or Firm*—Carlson, Gaskey & Olds PC

(57) ABSTRACT

A single-stage hypersonic vehicle is comprised of a low-speed and a high-speed propulsion system. The low-speed propulsion system propels the single-stage vehicle to a threshold velocity, after which the high-speed propulsion system then takes over. The low-speed propulsion system includes a combined-cycle engine featuring a swirl generator that is integrated into a turbojet engine to provide a compact turbojet and swirl afterburner-ramjet propulsion system. The high-speed propulsion system includes a hypersonic engine that is operable at the threshold takeover velocity and beyond. In various embodiments, the high-speed propulsion system comprises a scramjet, rocket, or scramjet/rocket engine depending requirements. Benefits of the swirl generator design include its ability to rapidly and efficiently atomize, vaporize, mix and burn the fuel and oxidizer for the low speed propulsion system, significantly reduce length, weight, cooling requirements and complexity for both propulsion systems, while maintaining high propulsion performance and reducing propulsion and launch costs.

32 Claims, 5 Drawing Sheets

U.S. PATENT DOCUMENTS

| | | | |
|---|---|---|---|
| 4,263,780 A | 4/1981 | Stettler | |
| 4,343,147 A | 8/1982 | Shekleton | |
| 4,461,146 A | 7/1984 | DuBell | |
| 4,470,262 A | 9/1984 | Shekleton | |
| H0019 H | 2/1986 | Carlson | |
| 4,598,553 A | 7/1986 | Saito et al. | |
| 4,648,571 A | 3/1987 | Gerhardt | |
| 4,686,826 A | 8/1987 | Koshoffer et al. | |
| 4,896,502 A | 1/1990 | Ravel et al. | |
| 4,919,364 A * | 4/1990 | John et al. | 244/55 |
| 4,930,309 A * | 6/1990 | Hartman | 60/267 |
| 4,934,632 A * | 6/1990 | Kim | 244/53 R |
| 5,052,176 A * | 10/1991 | Labatut et al. | 60/225 |
| 5,054,288 A * | 10/1991 | Salemann | 60/244 |
| 5,101,633 A | 4/1992 | Keller et al. | |
| 5,240,404 A | 8/1993 | Hemsath et al. | |
| 5,251,447 A | 10/1993 | Joshi et al. | |
| 5,284,014 A * | 2/1994 | Brossier et al. | 60/225 |
| 5,311,735 A | 5/1994 | Orlando | |
| 5,319,923 A | 6/1994 | Leonard et al. | |
| 5,319,935 A | 6/1994 | Toon et al. | |
| 5,337,975 A * | 8/1994 | Peinemann | 244/53 B |
| 5,351,480 A * | 10/1994 | Kretschmer | 60/771 |
| 5,411,394 A | 5/1995 | Beer et al. | |
| 5,511,970 A | 4/1996 | Irwin et al. | |
| 5,660,040 A * | 8/1997 | Henry et al. | 60/768 |
| 5,675,971 A | 10/1997 | Angel et al. | |
| 5,685,142 A | 11/1997 | Brewer et al. | |
| 5,779,169 A | 7/1998 | Sloan | |
| 5,845,480 A | 12/1998 | DeFreitas et al. | |
| 5,853,143 A * | 12/1998 | Bradley et al. | 244/3.21 |
| 6,301,900 B1 | 10/2001 | Mandai et al. | |
| 6,374,615 B1 | 4/2002 | Zupanc et al. | |
| 6,748,735 B2 | 6/2004 | Schmotolocha et al. | |
| 6,820,411 B2 | 11/2004 | Pederson et al. | |
| 6,895,756 B2 | 5/2005 | Schmotolocha et al. | |
| 6,907,724 B2 | 6/2005 | Edelman et al. | |
| 6,912,857 B2 | 7/2005 | Schmotolocha et al. | |
| 6,968,695 B2 | 11/2005 | Schmotolocha et al. | |
| 7,137,255 B2 | 11/2006 | Schmotolocha et al. | |
| 7,168,236 B2 | 1/2007 | Schmotolocha et al. | |
| 2007/0028594 A1 * | 2/2007 | Arata | 60/224 |

FOREIGN PATENT DOCUMENTS

| | | |
|---|---|---|
| GB | 774059 | 5/1957 |

* cited by examiner

SINGLE-STAGE HYPERSONIC VEHICLE FEATURING ADVANCED SWIRL COMBUSTION

CROSS-REFERENCE TO RELATED APPLICATION(S)

The present application is related to the following copending application Ser. No. 11/633,837 filed on the same day as this application: "TWO-STAGE HYPERSONIC VEHICLE FEATURING ADVANCED SWIRL COMBUSTION by inventors Robert J. Pederson, Stephen N. Schmotolocha and William W. Follett, which is incorporated herein by this reference.

BACKGROUND OF THE INVENTION

This invention relates generally to single-stage hypersonic vehicles and more particularly to propulsion systems for single-stage vehicles. Hypersonic vehicles are generally characterized as capable of achieving speeds of greater than approximately Mach 5, and have typically relied on rocket engines to achieve such speeds.

Launch vehicles or rocket boosters are primarily used to deliver satellites to orbit or weapons over large distances (ICBMs). However, most of the existing rocket designs are expendable, making them costly for most missions and less competitive in the world launch market. A transatmospheric vehicle (TAV) or reusable launch vehicle (RLV) would be capable of returning to earth to be reused after minimal refurbishment and refueling. TAVs most likely would have aerodynamic and operability characteristics similar to conventional aircraft but have capability of delivering payloads to low earth orbit (LEO). The promise of TAVs is that their reusability would potentially allow them to launch payloads into orbit at much lower cost than current expendable rockets.

Both single-stage-to-orbit and two-stage-to-orbit RLVs using hypersonic technology have been studied by NASA and others to deliver small to medium payloads to LEO, while single-stage hypersonic TAVs are under consideration by DoD and offer the promise of launch vehicle responsiveness and flexibility for military global strike missions and reconnaissance. If single-stage and two-stage TAVs could be operated more like an aircraft and less like an expendable rocket, they would offer the promise of carrying out space operations with greater flexibility and responsiveness than is currently possible with expendable boosters. In fact, for many military missions, including space control and force application, satellite payload deliver of 1,000 to 5,000 lbs into LEO may be adequate, compared to typical payload deliveries of 40,000 lbs (expendable launch boosters) and 65,000 lbs (Shuttle).

Whether for space access or global strike/reconnaissance, launch vehicle responsiveness is one of the most important requirements for a DoD TAV, since launching within minutes or hours of a launch order is critical to mission success. This degree of responsiveness implies aircraft-like levels of supportability and reliability. A military vehicle design capable of being launched on alert from a number of continental U.S. (CONUS) bases or forward operating locations could be very different from a commercial RLV designed for a predictable launch from a single launch facility (i.e., Kennedy Space Center). Other important DoD requirements that drive the TAV design include increased survivability associated with speed and altitude to counter "today's and tomorrow's threats", and the ability to neutralize time-critical targets. These requirements are driving TAV designs for DoD missions towards single-stage hypersonic vehicles.

Airbreathing propulsion engines have several advantages over expendable rockets, namely, they do not require stored liquid oxygen, which results in smaller and less costly launch vehicles. In addition, airbreathing engines don't have to rely strictly on engine thrust but can utilize available aerodynamic forces, thus resulting in far greater maneuverability. This can also manifest itself in greater vehicle safety since missions can be aborted much easier.

Alternatives to all-rocket propulsion systems include a combination of gas turbine jet engines, ramjets, scramjets and rockets that can be integrated into a combined cycle airbreathing propulsion system. Advanced turbojet engines, such as found in fighter aircraft, rely on compressing the air, injecting the fuel into it, burning the mixture, and expanding the combustion products through the nozzle to provide thrust at much higher specific impulses (Isp) than rocket engines. Turbojets can be used to provide horizontal takeoff—like conventional airplanes—and are currently materials limited to Mach 2-3 so as to prevent overheating and damage to the turbine blades. At this point another form of propulsion engine, called a ramjet, takes over. This is in lieu of undertaking an expensive development of high-temperature gas turbine blade materials technology to increase the maximum upper limit to approximately Mach 3-4. The ramjet engine operates by using a specially designed inlet to scoop up the ram air, slow it down and then compress it while the vehicle is flying through the atmosphere. Fuel is injected into the air, mixed with it, combusted and then expanded through the nozzle to provide thrust in a similar fashion to the turbojet. Ramjet engines operate most efficiently at vehicle speeds beyond Mach 2-3. A ramjet can be readily integrated into a turbojet engine. The turbojet by itself would operate from take-off to ramjet takeover, and the ramjet would then power the vehicle to its velocity limit of about Mach 6. Above this limit the combustion chamber temperature becomes very high, causing the combustion products to dissociate, which in turn reduces vehicle thrust.

To operate at still higher vehicle speeds, supersonic combustion ramjets, or scramjets as they are called, would be employed. Again, fuel is injected, mixed and combusted with the air, but at supersonic speeds, thus necessitating a different fuel injection scheme than that used by the ramjet. As the vehicle continues to accelerate into the upper atmosphere, rocket engines may be required to supplement the scramjet engine(s) for Mach numbers above 10-12. Certainly rocket engines would be required if orbit insertion and maneuvering in space (above Mach 18) were required.

There are two major hypersonic combined cycle vehicle design approaches for access to space, one featuring a single-stage vehicle and the other a two-stage vehicle. Some single-stage hypersonic vehicles rely on a low-speed propulsion system responsible for achieving the speed necessary for ramjet operation, and a high-speed propulsion system that operates as a ramjet or a combined ramjet/scramjet. Such systems, however, have several disadvantages. For example, the low-speed propulsion system typically relies on conventional gas turbine engine technology to achieve ramjet viable speeds (less than approximately Mach 3). The overall vehicle weight is sensitive to the weight of the combined propulsion system. Since development and operational cost typically scale with vehicle weight raised to an exponent, it is important to keep vehicle and propulsion weight to a minimum.

One way to eliminate the ramjet and its weight impact from the high speed flowpath is to close the Mach number gap between turbojets and scramjets. This can be accomplished by extending the maximum Mach number range of the gas turbine (turbojet) engine operability beyond Mach 3 and/or reducing the minimum Mach number range of scramjet operability to below Mach 6. However, a substantial investment on the order of hundreds of millions to billions of dollars may be required to advance the gas turbine art so as to minimize the Mach number gap. An alternate approach is to combine the ramjet flowpath with the turbine engine. This creates synergy since the ramjet can utilize the isolator that is already required by the turbine engine in a typical turbine based combined cycle concept installation, rather than creating a second isolator in the high speed flowpath. Further synergy can also be obtained by combining the turbojet engine afterburner with a ramjet combustor, which will then substantially reduce the length and weight of the combined propulsion system leading to significantly better vehicle performance. Thus, there is a need for a single-stage vehicle having an improved propulsion system that could be used by DoD for rapid response and flexibility to provide global strike/reconnaissance missions and access to space to deliver small to medium payloads into LEO at much lower costs than present expendable rockets (benefits both NASA and DoD).

BRIEF SUMMARY OF THE INVENTION

A single-stage hypersonic vehicle is comprised of a low-speed propulsion system and a high-speed propulsion system. The low-speed propulsion system propels the single-stage vehicle to a threshold velocity, at which the high speed propulsion system then takes over. The low-speed propulsion system includes a combined-cycle engine featuring a swirl generator, which is based on advanced swirl combustion technology, and then integrated into a turbojet engine to provide a compact turbojet and swirl afterburner-ramjet propulsion system. The high-speed propulsion system includes a hypersonic engine that is operable at the threshold takeover velocity and beyond. In various embodiments, the high-speed propulsion system comprises a scramjet, rocket, or scramjet/rocket engine depending on the mission profile and requirements. Benefits of the swirl generator design include its ability to significantly reduce length, weight, cooling requirements and complexity for the low-speed and high-speed propulsion systems, while maintaining high propulsion performance and reducing propulsion and launch costs.

DETAILED DESCRIPTION

Figure 1:
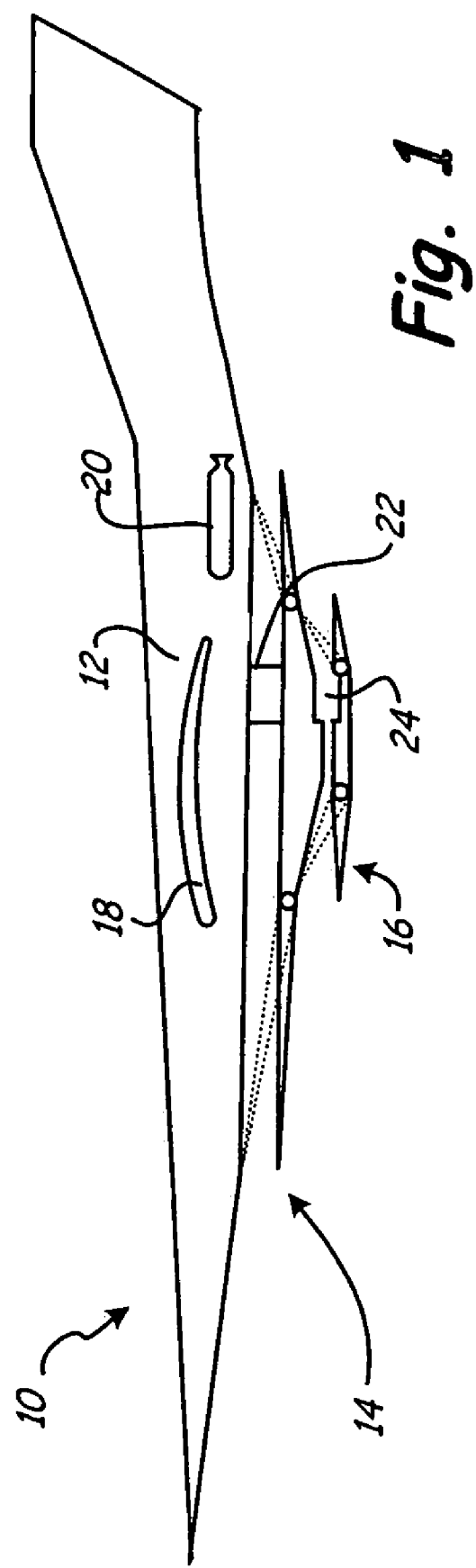
FIG. 1 shows a single-stage vehicle in which propulsion systems of the present invention are used.

FIG. 1 shows a diagram of single-stage vehicle 10 of the present invention. Single-stage vehicle 10 includes fuselage 12, in which low-speed propulsion system 14 and high-speed propulsion system 16 are incorporated. Fuselage 12 includes a pair of airfoils, including airfoil 18, and is configured for achieving flight by low-speed propulsion system 14 up to approximately a flight speed of Mach 6. At such a scramjet takeover speed, high-speed propulsion system 16 would continue to accelerate the single-stage vehicle to a Mach number range of approximately 10 to 18, depending on the mission requirements (e.g., high altitude global strike/reconnaissance). The scramjet takeover speed is typically a speed at which hypersonic propulsion becomes viable and is also known as a hypersonic threshold speed. Single-stage vehicle 10 also includes other components required for controlling and propelling vehicle 10, such as flight control systems and fuel systems, which are not shown for clarity, but are well known in the aerospace industry. Together, low-speed propulsion system 12 and high-speed propulsion system 14 operate to bring single-stage vehicle 10 to desired hypersonic speeds such as, for example, that necessary to meet NASA and/or DoD objectives. Additional propulsion components, such as rockets 20, are used to propel single-stage vehicle 10 to altitudes where air-breathing propulsion systems cannot operate, such as low-earth-orbit (LEO).

Low-speed propulsion system 14 typically include a combined-cycle turbo-ramjet engine 22, and high-speed propulsion system 16 typically includes a scramjet engine 24. Scramjet operation requires a continuous supersonic airflow in an isolator and a combustor to maintain inlet operability necessary for propulsion. Thus, in order for high-speed propulsion system 16 to operate properly as a scramjet, single-stage vehicle 10 must be brought up to a particular scramjet threshold speed sufficient to achieve supersonic combustion and operation by another source. Low-speed propulsion system 14 brings single-stage vehicle 10 up to the threshold speed of about Mach 5-6. With the assistance of swirl combustion technology in the form of a swirl afterburner-ram burner, turbo-ramjet engine 22 is able to bring single-stage vehicle 10 up to a required threshold speed suitable for scramjet operation. In one embodiment, high-speed propulsion system 16 is operable as a pure scramjet, unencumbered by subsonic propulsion systems. Thus, due to length and weight savings advantages obtained by the swirl combustion technology featuring a swirl generator design, single-stage vehicle 10 is able to more efficiently achieve hypersonic speeds.

Figure 2:
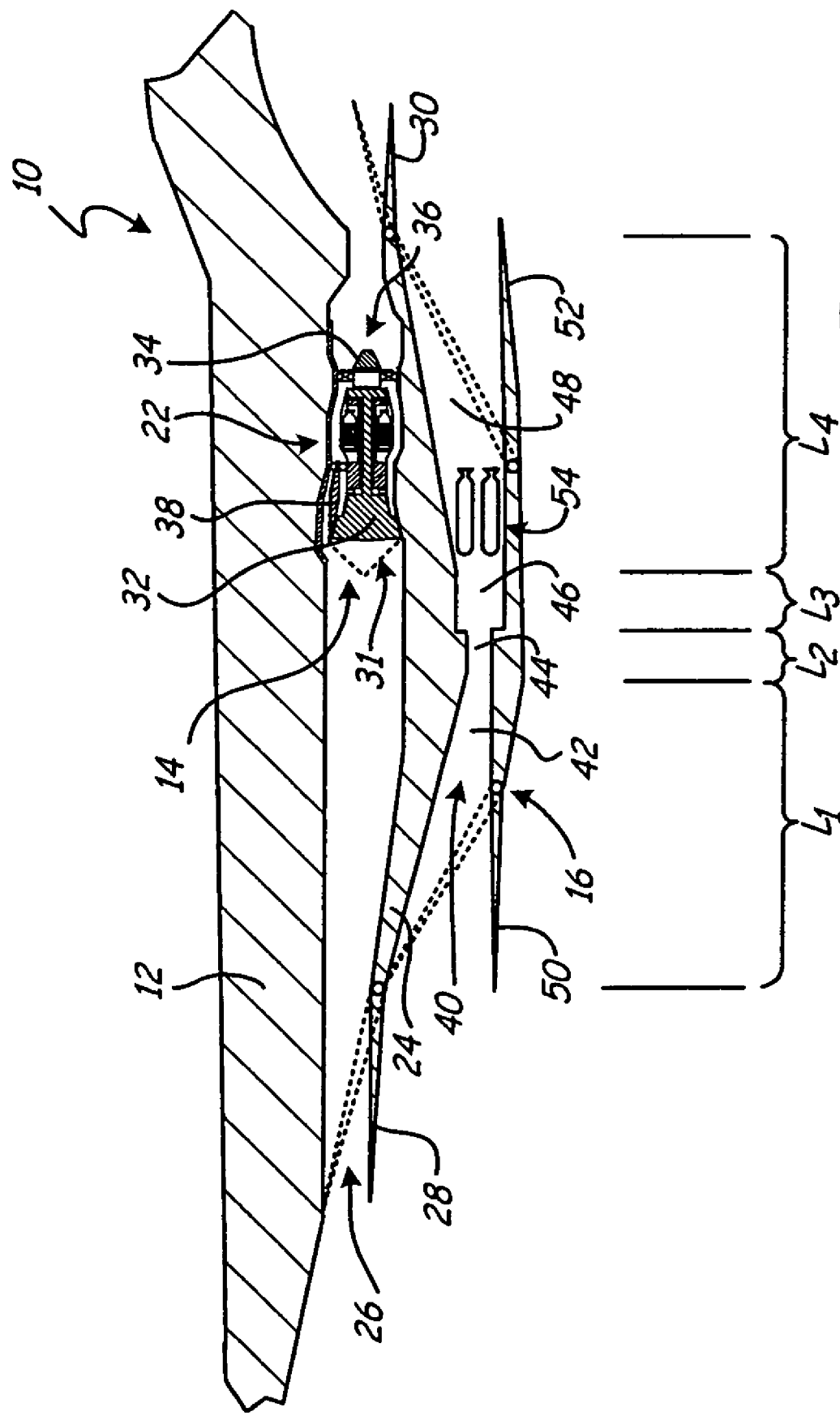
FIG. 2 shows a propulsion system for the single-stage vehicle of FIG. 1 having a low-speed propulsion system with a combined-flow configuration and a high-speed propulsion system.

FIG. 2 shows one embodiment of single-stage vehicle 10, including fuselage 12 in which low-speed propulsion system 14 and high-speed propulsion system 16 are incorporated as a system for propelling vehicle 10. Low-speed propulsion system 14 includes combined-cycle turbo-ramjet engine 22, which is situated in low-speed flowpath 26. Low-speed flowpath 26 includes a low-speed variable inlet duct 28, low-speed variable exit nozzle 30, and variable turbine ducting 31. Combined-cycle turbo-ramjet engine 22 includes a gas-turbine core engine 32 and swirl generator 34, which operates in conjunction with swirl-afterburner 36 and ramjet engine 38. High-speed propulsion system 16 comprises scramjet 24, which is mounted to fuselage 12 beneath low-speed propulsion system 14 within high-speed air flowpath 40. In the embodiment shown in FIG. 2, single-stage vehicle 10 also includes rockets 54 for additional thrusting, such as for higher velocity operation or non-air-breathing operation.

Low-speed propulsion system 14 includes combined-cycle engine 22, with a gas-turbine core engine 32 integrated with swirl-afterburner 36 and a ramjet engine 38. This low speed propulsion system is also configured for combined-flow operation in which a flowpath for ramjet engine 38 is integrated with the gas turbine core engine 32 so as to share space in low-speed flowpath 26. Combined-flow, combined-cycle engine 22 is described in FIG. 3. In this configuration, low speed combined-cycle engine 22 of propulsion system 14 is significantly reduced in length and weight, which significantly contributes to overall reduction in weight of single-stage vehicle 10.

Using gas turbine propulsion from core engine 32 (described in greater detail below with respect to FIG. 3), combined-cycle engine 22 operates to initially accelerate single-stage vehicle 10 from horizontal take-off. Propulsion from gas turbine core engine 32 and swirl-afterburner 36 accelerates single-stage vehicle 10 to a speed suitable for ramjet combustion (approximate Mach 2 to 3). Additional gas turbine thrust augmentation may be obtained by using swirl afterburner 36 integrated into combined-cycle engine 22 to increase the top speed of the gas turbine core engine 32. At ramjet take-over speed combined-cycle engine 22 converts to ramjet propulsion. Gas turbine combustion is then ceased, and ramjet propulsion takes over thrust production. As shown in FIG. 2, low-speed air flowpath 26, in conjunction with low-speed variable inlet duct 28 and low-speed variable exit nozzle 30, operate together as a ramjet. Low-speed variable inlet duct 28, an isolator duct 78 integrated into variable ducting 31 and low-speed exit nozzle 30 function together to control the low-speed airflow for ramjet operation. Together, low-speed variable inlet duct 28, gas turbine variable ducting 31 and low-speed variable exit nozzle 30 may adjust diameters and axial position such that air flow can be optimally directed into combined-cycle engine 22, where ramjet combustion takes place with the assistance of swirl generation technology. Swirl generator 34 is positioned in low-speed air flowpath 26 between low-speed variable inlet duct 28 and exit nozzle 30. As such, swirl generator 34 functions as a swirl enhanced ramjet, in addition to functioning as an afterburner for gas turbine core engine 32. Thus, low-speed propulsion system 14 saves length and weight by combining a gas turbine core engine, a swirl-afterburner and a swirl-ramjet into a single integrated propulsion system which share common components.

Figure 4:
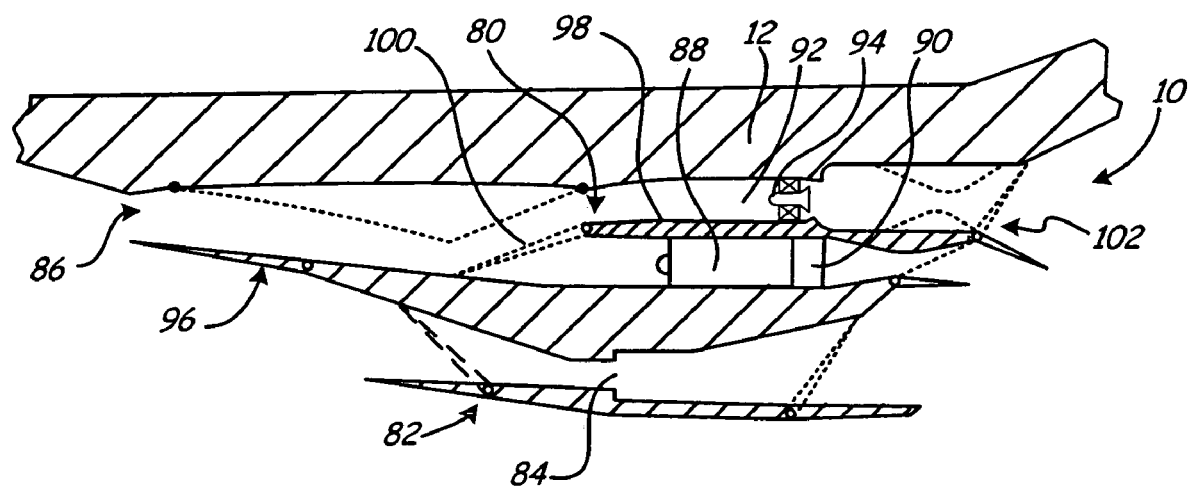
FIG. 4 shows a propulsion system for the single-stage vehicle of FIG. 1 having a low-speed propulsion system with a split-flow configuration and a high-speed propulsion system.

In the embodiment of FIG. 2, a single gas turbine engine is used. The number and size of gas turbine engines used is a design factor that can be determined based on, for example, the particular thrust-to-weight ratio desired. Additionally, other combined-cycle engine configurations can be used, such as split-flow configurations (as shown in FIG. 4), instead of the combined-flow configuration of FIG. 2. In other embodiments, single-stage vehicle 10 and propulsion system 14 can be arranged in other configurations.

With the weight and length saving advantages of combined-cycle, combined-flow low-speed propulsion system 14, the design and performance flexibility of single-stage vehicle 10 also improves. In particular, gas turbine core engine 32 is combined into low-speed flowpath 26 with ramjet 38 in a combined-flow configuration such that length and weight of low-speed propulsion system 14 is reduced. Additionally, gas turbine core engine 32 includes the variable inlet air cowling 31 such that weight is reduced. Furthermore, the swirl generator 34 improves mixing, atomization and evaporation, which leads to high combustion efficiency in short combustor lengths, resulting in reduced length and weight of gas turbine core engine 32.

These length and weight saving features result in significant enhancement in the performance of single-stage vehicle 10. For example, single-stage vehicle 10 benefits from increased range due to weight savings. Additionally, due to weight reduction without a sacrifice in thrust production, single-stage vehicle 10 achieves increased thrust-to-weight ratio. Additionally, single-stage vehicle 10 is more readily able to achieve threshold speeds and increase payload capabilities, thereby reducing the cost per pound of useable payload. Low-speed propulsion system 14 is expected to achieve threshold flight speeds of approximately Mach 5 to approximately Mach 6, which are viable for high speed scramjet operation.

High-speed propulsion system 16 is positioned below low-speed propulsion system 14 on fuselage 12, as shown in FIG. 2. High-speed propulsion system 16 is configured for operating at hypersonic velocities that can range from approximately Mach 6 to approximately Mach 18 and possibly above, for LEO insertion if required. In one embodiment, high-speed propulsion system 16 is a scramjet engine 24, which includes air flowpath 40 configured for pure scramjet operation. Flowpath 40 includes high-speed inlet duct 42, supersonic isolator 44, supersonic combustor 46 and high-speed exit nozzle 48. High-speed flowpath 40 can be closed off when high-speed propulsion system 16 is not used, such as during operation of low speed propulsion system 14, with hinged doors 50 and 52.

Because pure scramjet operation requires a continuous supersonic airflow to maintain combustion, high-speed propulsion system 16 relies on low-speed propulsion system 14 to attain initial propulsion up to speeds viable for scramjet engine 24 operation. At the ramjet-to-scramjet takeover speed, air enters flowpath 40, scramjet fuel is injected and then scramjet propulsion is initiated. Once scramjet viable speeds are reached, scramjet propulsion via high-speed propulsion system 16 is enabled. Air enters the high-speed inlet duct 42 of air flowpath 40 at supersonic speeds, which is continuously decelerated along the high-speed inlet duct 42. High-speed inlet duct 42 has a length $L_1$, over which a cross-sectional area thereof decreases such that the supersonic airflow is compressed and decelerated prior to supersonic isolator 44. The supersonic air proceeds into supersonic isolator 44, which controls the airflow exiting high-speed inlet duct 42. Supersonic isolator 44 has length $L_2$ to operate as a buffer section between high-speed inlet duct 42 and supersonic combustor 46 where combustion takes place as air flows through at supersonic velocities. Length $L_2$ depends on the flight speed at which the incoming air is captured by flowpath 40 and passes through to high-speed inlet duct 42 and the airspeed required for sustaining supersonic combustion. Supersonic isolator 44 prevents backward flow of air, minimizes combustor/inlet interaction and optimizes air speeds for combustion. Supersonic combustor 46 has length $L_3$ that is optimized to fully burn fuel in the airstream based on the threshold speed. After passing through supersonic combustor 46, supersonic products of combustion pass through high-speed exhaust nozzle 48 and exit high-speed propulsion system 16. Exhaust nozzle 48 has length $L_4$, over which the cross-sectional area increases such that the supersonic flow expands to produce thrust which propels and maneuvers single-stage vehicle 10.

The overall length of flowpath 40, including $L_1$, $L_2$, $L_3$ and $L_4$, is determined by the scramjet takeover or threshold speed. This scramjet threshold speed is the speed at which the high-speed propulsion system 16 takes over predominant thrust production for the single-stage vehicle 10, from the low-speed propulsion system 14. In one non-limiting embodiment, the threshold speed is a speed viable for scramjet operation, typically around Mach 5-6.

In conventional propulsion systems where the low-speed propulsion system comprises a gas turbine engine, and the high-speed propulsion system includes a ramjet, a minimal threshold speed of approximately Mach 2-3 is necessary to be efficient. The lower the threshold speed, the longer the inlet duct must be in the high-speed propulsion system. Conversely, higher threshold speeds allow for shorter, lighter second-stage propulsion systems. With conventional gas turbine and ramjet technology, threshold speeds are typically about Mach 2.5 to about Mach 3. Ramjet operation requires that the supersonic freestream Mach number be reduced to a subsonic value within the inlet isolator, which is prior to entering the combustor, so that subsonic combustion can take place. A diffuser can be integrated into the isolator length to shock-down the supersonic airflow to subsonic speeds. Therefore, ramjet propulsion systems require additional isolator lengths and combustor lengths. Additionally, during ramjet operation, in which the supersonic air is slowed down to subsonic speed levels, pressure imbalances due to, for example, shock waves, may develop in the airflow during operation. The shock waves and subsonic flows have a tendency to advance forward in the flowpath and slow the flow stream to a point where the ramjet will not function properly. Therefore, an isolator having a sufficient length can be used to control shock waves and reverse airflows. Thus, it is advantageous to increase the threshold speed to shorten the flowpath length in the high-speed propulsion system.

In one non-limiting embodiment, low-speed propulsion system 14 is able to achieve threshold speeds suitable for scramjet operation. Thus, flowpath requirements for ramjet, or subsonic, operation can be eliminated, and the flowpath can be significantly shortened. Hence, high-speed propulsion system 16 is configured for pure scramjet operation, resulting in a lighter, more compact single-stage vehicle.

Due to the length and weight saving advantages of single-stage vehicle 10, including benefits derived from swirl generators, the upper ramjet operational threshold for single-stage vehicle 10 is expected to be pushed higher to about Mach 5-6. The length of high-speed propulsion system 16 may thus be significantly reduced. Based on various test results, calculations and assumptions, it is expected that supersonic combustor 46 can be reduced about 35%-65%, and supersonic isolator 44 can be reduced by about 50% or more as compared to a conventional ramjet/scramjet propulsion system. Thus, the overall length of flowpath 40 can be reduced about 13%-38% and thereby reducing the weight of single-stage vehicle 10 accordingly, resulting in much lower costs per usable payload. Additionally, since flowpath 40 is significantly reduced in length, the cooling system for vehicle 10 can be correspondingly reduced in capacity, to further reduce the weight of vehicle 10. Also, in other embodiments, high-speed inlet duct 42 and exit nozzle 48 are variable area nozzles to control airflow through flowpath 40. Since subsonic flows are eliminated, the required range of the geometries for variable high-speed inlet duct 42 and variable exit nozzle 48 can be reduced, as compared to ramjet/scramjet designs, to again reduce the weight of single-stage vehicle 10.

Alternatively, flowpath 40 could be selectively lengthened in places other than the supersonic isolator 44 or combustor 46 to enhance the performance of scramjet engine 24. For example, length $L_1$ could be lengthened such that the contraction ratio of high-speed inlet duct 42 is decreased, and the expansion ratio in nozzle 48 can be decreased by lengthening length $L_4$. In yet another embodiment, the high-speed propulsion system is a ramjet/scramjet wherein the threshold speed can be an intermediate speed within the ramjet operational range, thereby allowing customization of each speed propulsion system for operational requirements.

In the embodiment shown in FIG. 2, high-speed propulsion system 16 may also be configured with rockets 54 for auxiliary rocket-based propulsion. Thus, as an alternative to, or in conjunction with external rocket 20 of FIG. 1, the operable range of single-stage vehicle 10 is extended to low-earth-orbit missions and/or payload insertions. In one application, rockets 54 are used for orbit insertion and maneuvering where a supply of oxygen is not available for the operation of air-breathing engines such as turbines, ramjets or scramjets. In another embodiment, rockets 54 are mounted within flowpath 40 of FIG. 2, whereby flowpath 40 is still operable as ramjet, scramjet, or combined ramjet/scramjet as described above. In a further embodiment, rockets 54 are mounted externally to fuselage 12, such as rocket 20 shown in FIG. 1 are used to assist the scramjet engine for orbital insertion and operation alone in space for maneuvering. Rockets 20 and/or rockets 54 are operable in conventionally known manners.

In still another embodiment, single-stage vehicle 10 could rely on only rocket propulsion. As such, the high-speed propulsion system would primarily comprise only internally mounted rockets 54 without flowpath 40, or externally mounted rocket 20. In conjunction with the advantages achieved in low-speed propulsion system 14, a rocket-based high-speed propulsion system can realize increases in performance such as increases in cost per usable payload ratio and thrust-to-weight ratio, similar to performance increases realized in air-breathing high-speed propulsion systems.

Figure 3:
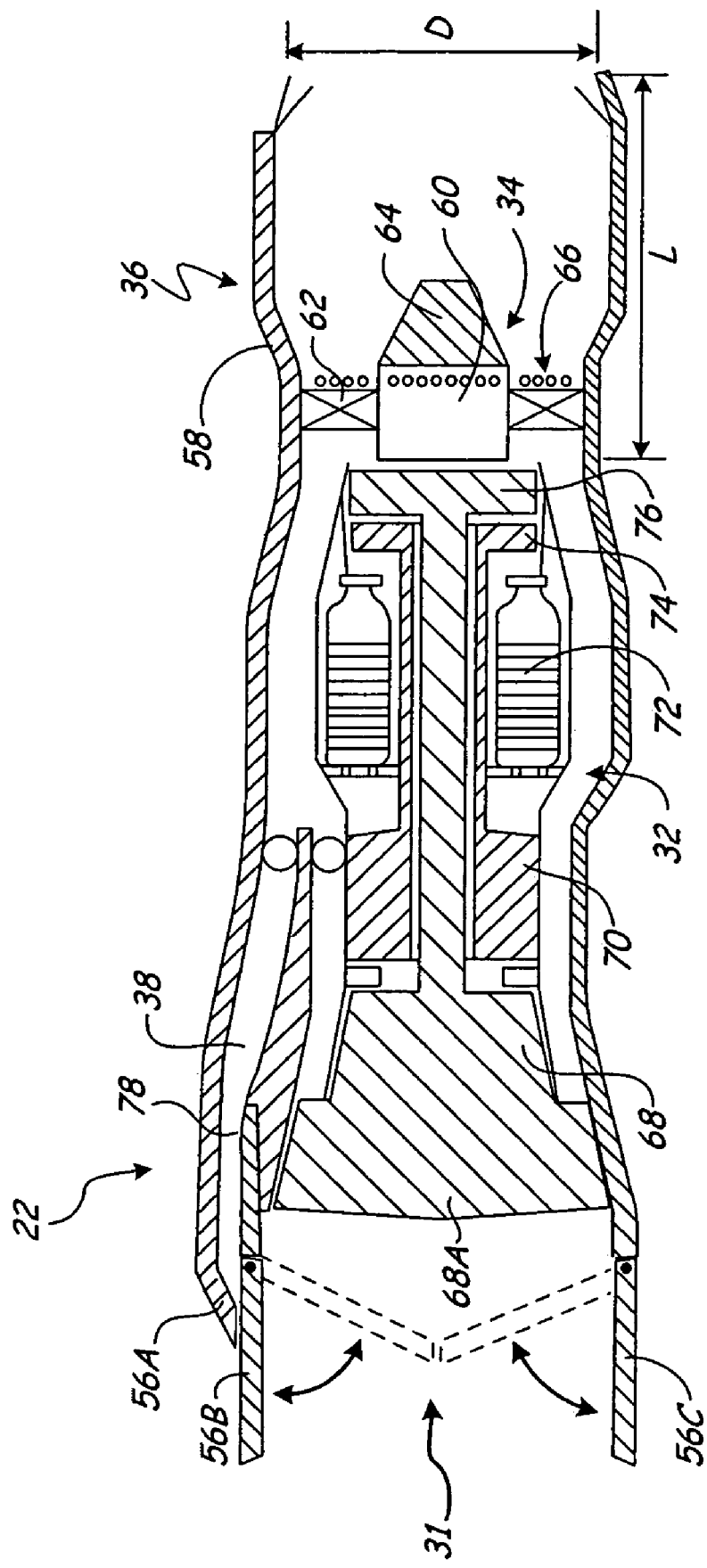
FIG. 3 shows a combined-cycle engine including a gas turbine engine integrated with a swirl afterburner-ramjet engine using a common swirl generator for use in the single-stage vehicle of FIGS. 1, 2 and 4.

FIG. 3 shows one embodiment of combined-cycle turbo-ramjet engine 22 for use in single-stage vehicle 10 of FIGS. 1 and 2. Combined-cycle turbo-ramjet engine 22 is shown as a low-speed, combined-cycle, turbo-ramjet engine with a swirl afterburner. Combined-cycle turbo-ramjet engine 22 includes gas-turbine core engine 32, ramjet 38 and swirl generator 34. An in-depth description of swirl generators and augmentation used in the present invention is found in "COMBINED CYCLE ENGINES INCORPORATING SWIRL AUGMENTED COMBUSTION FOR REDUCED VOLUME AND WEIGHT AND IMPROVED PERFORMANCE," U.S. Pat. No. 6,907,724 by Edelman et al., which is incorporated by this reference. Here, a brief overview of combined-cycle engine 22 of FIG. 3 is provided so that the advantages of the present invention are more readily understood.

Combined-cycle, turbo-ramjet gas-turbine engine 22 includes swirl generator 34, gas-turbine core engine 32, swirl-afterburner 36, ramjet 38, a ramjet cowl 56A, a first turbine cowl 56B, a second turbine cowl 56C, and an exhaust duct 58. Swirl generator 34, the details of which are disclosed in "COMPACT, LIGHTWEIGHT HIGH-PERFORMANCE LIFT THRUSTER INCORPORATING SWIRL-AUGMENTED OXIDIZER/FUEL INJECTION, MIXING AND COMBUSTION," U.S. Pat. No. 6,820,411 by Pederson et al., which is incorporated by this reference, includes centerbody 60, variable swirl vanes 62, centerbody cone 64 and a plurality of fuel injectors 66. Core engine 32 comprises typical gas turbine technology such as low pressure compressor 68 (including bypass fan portion 68A), high pressure compressor 70, main combustion chamber 72, high pressure turbine 74 and low pressure turbine 76. Ramjet 38 includes isolator 78. Combined-cycle gas-turbine engine 22 includes the variable ducting 31 to selectively transition between operation as a gas turbine and a ramjet. In the embodiment shown, the variable ducting 31 includes the ramjet cowl 56A, the first turbine cowl 56B and the second turbine cowl 56C which may operate together to control airflow between the core engine 32 and the ramjet 38. FIG. 3 shows one embodiment of the variable ducting 31, although it should be understood that the ducting can be modified or adjusted as is known in the art for different designs. For example, the variable ducting may be optimized for aerodynamic flow within the specific ducting of each propulsion system.

Inlet air enters low pressure compressor 68 when first and second turbine cowl 56B, 56C are generally parallel to the core engine 32 axis (as shown in solid lines). As such, core engine 32 is functional as a typical gas-turbine engine. In this configuration, first turbine cowl 56B contacts ramjet cowl 56A such that air is prevented from entering isolator 78. Additionally, in this mode, swirl vanes 62 of swirl generator 34 would be aligned with the airflow to permit unobstructed flow during normal gas turbine operation. For example swirl vanes 62 could be aligned parallel to the direction of flow to cancel swirl and prevent undue pressure loss in the airflow for ramjet operation. During afterburner mode, however, swirl vanes 62 are rotated about their vertical axis or otherwise skewed to the direction of flow to produce swirl in the airflow and to shorten the afterburning mixing-combustion process. For example, an engine controller can be used to automatically set the angle of swirl vanes 62 to a predetermined design value so as to generate the requisite swirling flowfield for afterburning operation. Thus, first-stage vehicle 12 can be brought from a zero velocity up to a velocity suitable for take-off and flight by core engine 32. Subsequently, ramjet 38 can be used to propel first-stage vehicle 12 up to a threshold takeover velocity.

For ramjet operation, inlet air enters isolator 78 between ramjet cowl 56A and first turbine cowl 56B when first and second turbine cowl 56B, 56C are in a retracted position (as shown in dashed lines). In this configuration, first turbine cowl 56B contacts second turbine cowl 56C such that air is prevented from entering core engine 32. As such, inlet air flows around core engine 32 to swirl generator 34 for ramjet combustion. Additionally, in this mode, swirl vanes 62 of swirl generator 34 would be rotated skewed to the direction of flow to produce swirl in the airflow and to shorten the mixing-combustion process. For example, the engine controller could set the rotation of swirl vanes 62 to a predetermined design angle to produce the required amount of swirl for ramjet operation. Core engine 32 is also insulated to withstand the elevated temperatures of ramjet operation. Thus, in both operational modes, core engine 32 and ramjet 38 utilize the same swirl generator 34.

Swirl generator 34 has two purposes, first to selectively operate as a gas turbine afterburner 36 and when inlet air bypasses gas turbine engine 32 through isolator 78 as the ramjet engine 38. Length and weight of swirl-afterburner 36 are considerably reduced as compared to conventional afterburners. An in depth description of swirl-enhanced combustion to improve performance of gas turbine afterburner 36 used in the present invention is found in "COMPACT SWIRL AUGMENTED AFTERBURNERS FOR GAS TURBINE ENGINES," U.S. Pat. No. 6,895,756 by Schmotolocha et al., which is incorporated by this reference. Here, a brief overview of swirl-afterburner 36 of FIG. 3 is provided so that the advantages of the present invention are more readily understood.

For conventional afterburner operation, it would typically be necessary to position a series of fuel spray bars just downstream of the exhaust duct 58 in order to provide fuel for combusting in the afterburner. Typically, five to seven injector segments are necessary. Additionally, a plurality of flameholders are required downstream of the spray bars to anchor the flame and ensure stable, self-sustained combustion. Thus, in order to achieve thrust augmentation with a conventional afterburner, the exhaust duct must be lengthened to include spray bars and flameholders as well as provide sufficient residence time for afterburning the fuel. This adds considerable length and weight to the engine. Conventional afterburners may additionally include a diffuser cone to reduce pressure losses positioned downstream of the low-pressure turbine 76. Typically, conventional afterburner systems require an exhaust duct having a length-to-diameter ratio (L/D) of about 4.

Utilizing swirl generator 34, the present invention is able to achieve an exhaust duct L/D of 1.6 or less, resulting in about a 60% reduction in afterburner length and thus also reduced weight. During operation of core engine 32, swirl generator 34 swirls and mixes air-rich hot gases exiting combustor 72 after they pass through high pressure turbine 74 and low pressure turbine 76, and compressed bypass air that exits bypass fan 68A. (Also, during operation of ramjet 38, swirl generator 34 swirls the compressed air exiting ramjet isolator 78.) Utilizing similar components as were described with respect to FIG. 2, swirl generator 34 imparts swirling three-dimensional flowfield aerodynamics on the combined hot-gas and cold-air streams providing rapid intermixing of the two streams, followed by just as rapid mixing of both oxygen-rich streams with the injected afterburner fuel, then effectuates rapid and efficient afterburning.

Swirl generator 34, as described above, improves mixing of the combustion constituents and flame propagation as well as spreading such that combustion processes are accelerated during both gas-turbine and ramjet operation. Particularly, combustion is completed more quickly and completely than a conventional afterburner or ramjet combustor. In the case of a conventional afterburner, the fuel is injected into the high-velocity airstream, and the mixture is typically expanded into a sudden dump combustor where combustion takes time (and length) to complete. However, in case of the present invention, since combustion occurs more rapidly, a shorter combustor can be used, thereby reducing the length of swirl-afterburner 36. Additionally, fewer components are necessary, reducing the weight of swirl afterburner 36. As a result of the decreased size of swirl afterburner 36, cooling requirements for gas-turbine engine 32 are also reduced, which further increases the weight-saving advantages of swirl afterburner 36.

Therefore, gas turbine core engine 32, when combined with swirl-afterburner 36, is able to reach peak flight speeds with a lighter engine. In one embodiment, combined-cycle engine 22 propels single-stage hypersonic vehicle 10 to about a Mach 2.5-3.0 flight speed regime, and the swirl-enhanced ramjet then accelerates to the Mach 6 range. With a lighter combine-cycle turbojet/ramjet engine, single-stage vehicle 10 is more readily able to reach higher velocities. Particularly, combined-cycle engine 22 is able to reach speeds suitable for sustaining scramjet operation such that scramjet propulsion can be uncoupled from ramjet propulsion.

Since the unique combination of a swirl afterburner/ramjet design can play a double role (either as a gas turbine afterburner or a ramjet by using bypass doors to route the air around the outside of the gas turbine engine core to the swirl combustor as in FIG. 3), the length for a standard gas turbine afterburner can be dramatically reduced. The benefits to be gained amount to an estimated 60% reduction in traditional gas turbine afterburner length, reduced weight and heat load due to a shorter afterburner length (as described above) and higher thrust-to-weight ratio.

FIG. 4 shows a second embodiment of single-stage vehicle 10 of FIG. 1 having a low-speed propulsion system 80 with a split-flow over/under design configuration. Single-stage vehicle 10 includes fuselage 12, in which is positioned a low-speed propulsion system 80 and a high-speed propulsion system 82. High-speed propulsion system 82 includes a scramjet engine 84 that is similar to that of scramjet engine 24 of FIG. 2. Low-speed propulsion system 80 includes a flowpath 86, a gas turbine engine 88, a swirl-afterburner 90, and a swirl-ramjet with a swirl generator 94. Flowpath 86 includes a low-speed variable inlet duct 96, a low-speed flowpath divider 98, a low-speed variable inlet duct 100 and a low-speed variable exit nozzle 102.

Low-speed propulsion system 80 includes a combined-cycle gas turbine engine 88 and swirl-ramjet 92 are integrated into fuselage 12 in a split-flow configuration such that each occupy a separate portion of flowpath 86. Gas turbine engine 88 is separated from swirl-ramjet 92 by flowpath divider 98. During operation of gas turbine 88, variable inlet duct 100 closes off airflow to swirl-ramjet 92. Gas turbine engine 88 operates to initially accelerate single-stage vehicle 10 from horizontal take-off until flight is obtained. Gas turbine engine 88 is further able to accelerate single-stage vehicle 10 to a speed suitable for ramjet combustion using a combination of gas turbine engine 88 and swirl-afterburner 90.

At a ramjet takeover speed of approximately Mach 2-3, gas-turbine engine 88 shuts down, and swirl-ramjet 92 takes over thrust production. First, however, variable inlet duct 100 operates to close off airflow to gas turbine 88 and direct air into swirl-ramjet 92. Thus, air flowpath 86, in conjunction with variable inlet nozzle 96 and variable exit nozzle 102, is operable as a ramjet. Together, variable inlet nozzle 96 and variable exit nozzle 102 function as a converging/diverging nozzle for ramjet operation. Ramjet swirl generator 94 is positioned in air flowpath 86 between inlet nozzle 96 and exit nozzle 102, and functions as a swirl-enhanced ramjet during ramjet operation. The ability of swirl generator 94 to promote faster mixing, atomization and evaporation of fuel and oxidizer (air), results in higher combustion efficiency, combustion stability and wider flammability, but in a significantly shorter combustor flowpath length. This high ramjet engine 92 performance in a much shorter combustor length, compared to a typical ramjet improves the ability and efficiency of single-stage vehicle 10 to achieve scramjet viable speeds. In a split-flow configuration, swirl generator 94 does not operate as an afterburner for gas turbine engine 88, but additional swirl generators can be used as such as described in FIG. 5. However, since swirl-ramjet 92 operation is viable at speeds within the capability of un-augmented gas turbine engine operation, the ability to utilize swirl generator 94 with swirl-ramjet engine 92 permits additional flight speed flexibility for scramjet operation.

Figure 5:
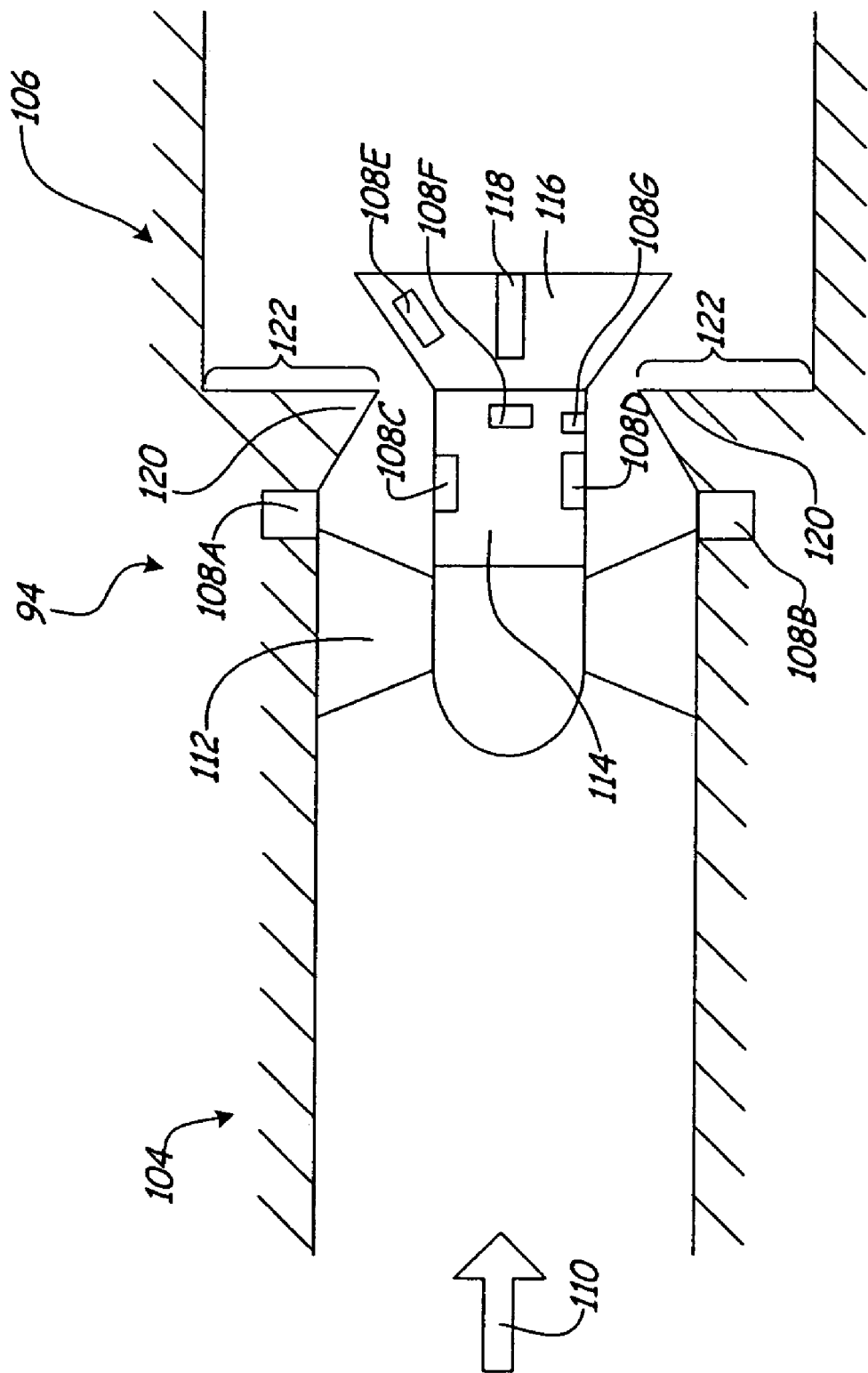
FIG. 5 shows a swirl generator for use in propulsion systems of the single-stage vehicle of FIG. 1.

FIG. 5 shows swirl generator 94, which demonstrates one embodiment of advanced swirl combustion technology, for use in propulsion systems of single-stage vehicle 10 of FIG. 1. Swirl generator 94, similar to that of swirl generator 34 of FIG. 3, improves mixing between two combustion constituents, e.g. a fuel and an air oxidizer, which are integrated into a gas turbine and ramjet propulsion engine. Swirl generator 94 enhances mixing such that combustion can be more completely and rapidly carried out, enabling shorter and lighter components such as combustors. Thus, single-stage vehicle 10, by incorporation of swirl combustion technology, is able to improve performance parameters such as increased thrust-to-weight ratios due to a reduction in afterburner-ramjet combustor length and reduced weight. An in-depth description of swirl generator and swirl combustion technologies used in the present invention is found in "COMPACT, LIGHTWEIGHT HIGH-PERFORMANCE LIFT THRUSTER INCORPORATING SWIRL-AUGMENTED OXIDIZER/FUEL INJECTION, MIXING AND COMBUSTION," U.S. Pat. No. 6,820,411 by Pederson et al., which is incorporated by this reference. Here, a brief overview is provided so that the advantages of the present invention are more readily understood.

Swirl generator 94 includes delivery duct portion 104, inlet ramp 120, dump-step 122, combustor portion 106 and a fuel injection system comprising fuel injectors 108A-108G. Delivery duct portion 104 directs first combustion constituent (e.g. air) 110 toward combustor portion 106. Swirl generator 94 includes swirl vanes 112, a centerbody 114, a bluffbody 116 and an igniter 118. Swirl generator 94 imposes a high-shear vortical flow into combustion constituent 110 (e.g. an air oxidizer), which is burned with a second combustion constituent (e.g. fuel) to produce thrust, thereby producing a more efficient, shorter combustion process.

Combustion constituent 110 enters delivery duct 104 in a generally axial direction. Swirl vanes 112 impart tangential and radial velocities into first combustion constituent 110, thereby producing a highly turbulent, three-dimensional flowfield having a large central recalculation zone (CRZ) downstream of bluffbody 116 and an outer recirculation zone (ORZ) anchored by the dump step 122. Into this flowfield the second combustion constituent is injected. Swirl vanes 112 are variable such that, depending on the operational mode of propulsion system 14, they can be aligned with the airflow to not produce swirl, or aligned skewed to the airflow such that they produce swirl. In one embodiment, there are twelve swirl vanes in a vane pack having an approximately flat profile (number of swirl vanes are dependent on the size of the propulsion system). In various embodiments of the present invention, combustion constituent 110 comprises compressed air provided by a gas turbine engine, a ramjet or a scramjet. Injectors 108A-108G introduce the second combustion constituent, such as an aerospace grade fuel, into the swirling flow of first combustion constituent 110. Due in part to the three-dimensional flowfield produced by swirl vanes 112, highly efficient mixing of combustible constituent 110 and the second combustion constituent injected by injectors 108A-108G is achieved. Injectors can be positioned in various combinations along the perimeter of air delivery duct 104, along centerbody 114, such as injectors 108A and 108B; in centerbody 114, such as injectors 108A, 108D, 108F, 108G and 108D; or in bluffbody 116, such as injector 108E. Injectors 108A-108G may comprise orifice type, simplex, or fan spray atomizer injectors, or other types of injectors that are known to those skilled in the art.

Centerbody 114 links vanes 112 with bluffbody 116 and houses other components such as midstream injectors 108C and 108F, and igniter 118. Bluffbody 116 anchors the CRZ such that combustion is stabilized immediately downstream of swirl generator 94, as it enters combustor portion 106. As the mixed combustion constituents enter combustor portion 106, inlet ramp 120 and dump-step 122 separate the outer boundary layer of the flowfield, which produces a toroidal outer recirculation zone (ORZ) in the three-dimensional flowfield. Dump-step 122 can be aerodynamically shaped to produce and stabilize the ORZ, while aerodynamically shaped ramp 120 compresses the combustion constituents, intensifies ORZ and CRZ shear layers and increases the amount of mass entrainment into the ORZ and CRZ. An ignition system, typically located in swirl generator 94 such as igniter 118, initiates a combustion process with the combustion constituents as they enter combustor portion 106. This same location (as ignitor 118) could alternately be utilized as a fuel injection site, if required. Optional ignitor(s) may be placed in the dump-step region of the ORZ as may be dictated by design variances in the flowpath of incoming oxidizer 36 and/or geometry of swirl generator 94. A dump-step ignition system could be applied to a separate stand-alone ramjet flowpath or as in the case of a combined-cycle gas turbine swirl afterburner/ramjet flowpath. Bluffbody 116 comprises a channeled flare at the trailing edge of centerbody 114 that further enhances the mixing of the combustion constituents and deflects the near-CRZ aeroflow complex radially outward as it enters combustor portion 106 so that its shear layer can merge early with the ORZ shear layer. Bluffbody 116 also anchors the CRZ and expands its volume. The resulting combined actions of the ORZ and CRZ swirling flow aerodynamics produce rapid and robust combustion in a compact space. The twin ultimate benefits are improved thrust performance and shorter-lighter combustors for propulsion engines. In various embodiments, bluffbody 116 also contains orifice injectors such as injector 108E. In one embodiment, bluffbody includes approximately a 25° flare having ten channels, but these parameters can be adjusted to produce the desired amount of turbulence in the flowfield, including a smooth flare without channels.

The combined highly turbulent swirling flowfield downstream of bluffbody 116, including both shear layers and the ORZ and the CRZ, provide more effective mixing of the combustion constituents as they enter combustor portion 106, and considerably accelerate the combustion processes used for producing thrust. The combined effects of this flow aerodynamics is much faster mixing, atomization, evaporation, which result in much higher combustion efficiency, combustion stability and wider flammability limits. Since the combustion constituents are better entrained, complete combustion of the constituents can be achieved more rapidly, particularly in the field of interaction between the ORZ and CRZ where shear stresses are extremely high and where the main combustion takes place. Thus, with the accelerated combustion process, shorter combustors can be used in propulsion systems employing swirl generators such as swirl generator 94. Additionally, the configuration of swirl generator 94 produces a controlled rapid rise of swirl during fuel injection, followed immediately by a rapid decay of swirl during the combustion process, thus ensuring 99% of thrust recovery in the short-length combustor.

Due to the size and weight saving advantages of low-speed propulsion systems 14 and 80, including benefits from swirl generators 34 and 94, the low-speed propulsion system is able to accelerate single-stage vehicle 10 up to a scramjet threshold speed suitable for initiating supersonic combustion. Length and weight reductions achieved by integrating core engine 32 with swirl ramjet 38 and swirl afterburner 36 into combined cycle propulsion system (FIG. 3). Similarly, length and weight reductions are achieved by integrating swirl afterburners into gas turbine engine 88 (FIG. 4). Additionally, swirl generator 94 is incorporated into flowpath 86 to reduce the size and length of ramjet engine 92 (FIG. 4). When brought up to the scramjet threshold speed by low-speed propulsion system 14 or 80, high-speed propulsion system 16 or 82 can operate as a pure scramjet, unencumbered by the additional weight and length of subsonic propulsion components. Thus, there is greater flexibility in selecting design parameters such as thrust-to-weight ratio for single-stage vehicle 10.

Although the present invention has been described with reference to preferred embodiments, workers skilled in the art will recognize that changes may be made in form and detail without departing from the spirit and scope of the invention.

The invention claimed is:

1. A single-stage hypersonic vehicle having a low-speed propulsion system and a high-speed propulsion system, the single-stage vehicle comprising:
 a low-speed propulsion system for propelling the single-stage vehicle to a threshold velocity to allow takeover by the high-speed propulsion system; the low-speed propulsion system including:
  a low-speed variable inlet duct;
  a combined-cycle turbo-ramjet engine having a gas turbine engine and a ramjet engine downstream of said low-speed variable inlet duct;
  a swirl generator to promote rapid mixing and combustion for the combined-cycle turbo-ramjet engine, said swirl generator including:
   a centerbody;
   a vane pack with a multiple of swirl vanes which support said centerbody, said swirl vanes variable between an aligned position and a skewed position; and
   a fuel injector within said centerbody; and
  a low-speed variable exit nozzle downstream of said swirl generator; and
 a high-speed propulsion system including a hypersonic engine operable at the threshold velocity or above.

2. The single-stage vehicle of claim 1 wherein the hypersonic engine comprises a scramjet engine.

3. The single-stage vehicle of claim 2 wherein the threshold speed comprises a speed viable for scramjet operation.

4. The single-stage vehicle of claim 2 wherein the threshold speed is approximately Mach 5 to approximately Mach 6.

5. The single-stage vehicle of claim 2 wherein the scramjet operates utilizing airflow having supersonic and above velocities.

6. The single-stage vehicle of claim 1 further comprising a rocket-engine mounted to the single-stage hypersonic vehicle.

7. The single-stage vehicle of claim 6 wherein said rocket-engine is mounted within a flowpath of said supersonic combustor upstream of said high-speed variable exhaust nozzle and downstream of said supersonic combustor.

8. The single-stage vehicle of claim 1 wherein the hypersonic engine comprises a rocket-engine.

9. The single-stage vehicle of claim 1 wherein the hypersonic engine includes a combined ramjet and scramjet engine.

10. The single-stage vehicle of claim 1 wherein
 said gas turbine is operable to accelerate the single-stage vehicle to a supersonic ramjet takeover speed;
 and said ramjet engine operable to accelerate the single-stage vehicle to hypersonic threshold speeds.

11. The single-stage vehicle of claim 10 wherein the swirl generator operates as an afterburner for the gas turbine engine.

12. The single-stage vehicle of claim 11 wherein said swirl vanes are aligned with an airflow to permit unobstructed flow during normal gas turbine operation.

13. The single-stage vehicle of claim 11 wherein said swirl vanes are skewed to an airflow to permit to produce swirl in the airflow and to shorten the afterburning mixing-combustion process during afterburning gas turbine operation.

14. The single-stage vehicle of claim 10 wherein the swirl generator operates as an afterburner for the ramjet engine.

15. The single-stage vehicle of claim 14 wherein said swirl vanes are skewed to an airflow to produce swirl in the airflow and to shorten the mixing-combustion process during ramjet operation.

16. The single-stage vehicle of claim 15 further comprising a variable inlet air cowling downstream of said low-speed variable inlet duct and upstream of said combined-cycle turbo-ramjet engine, said variable inlet air cowling selectively operable such that said combined-cycle turbo-ramjet engine is selectively operable as said gas turbine engine and a said ramjet.

17. The single-stage vehicle of claim 10 wherein combined-cycle engine comprises a combined-flow configuration wherein the ramjet is integrated into a portion of a flowpath of the gas turbine engine.

18. The single-stage vehicle of claim 1 wherein said swirl generator is downstream of said combined-cycle turbo-ramjet engine.

19. The single-stage vehicle of claim 1 wherein said swirl generator is operable as an afterburner for said combined-cycle turbo-ramjet engine.

20. The single-stage vehicle of claim 1 further comprising a fuel injector within said vane pack.

21. The single-stage vehicle of claim 1 further comprising a variable inlet air cowling upstream of said combined-cycle turbo-ramjet engine, said variable inlet air cowling selectively operable such that said combined-cycle turbo-ramjet engine is selectively operable as a said gas turbine engine and a said ramjet.

22. The single-stage vehicle of claim 21 wherein said variable inlet air cowling is downstream of said low-speed variable inlet duct.

23. The single-stage vehicle of claim 1 wherein said low-speed variable exit nozzle defines a length-to-diameter ratio (L/D) of 1.6 or less.

24. The single-stage vehicle of claim 1 wherein the hypersonic engine comprises:
   a high-speed variable inlet duct;
   an isolator downstream of said high-speed variable inlet duct;
   a supersonic combustor downstream of said isolator; and
   a high-speed variable exhaust nozzle downstream of said supersonic combustor.

25. The single-stage vehicle of claim 24 wherein the swirl generator further comprises:
   said centerbody positioned in a flow stream of a first combustion constituent;
   said vane pack operable to introduce a swirling, turbulent three-dimensional flowfield downstream of said vane pack and having a central recirculation zone downstream of the vane pack in the flow stream of the first combustion constituent;
   said fuel injection operable to introduce a second combustion constituent into the three-dimensional turbulent flowfield;
   a ramp to increase compression and acceleration of the swirling flowfield;
   a dump-step having aerodynamic ramp shaping for anchoring an outer recirculation zone of the flow stream of the first combustion constituent and for anchoring a turbulent mixing-combusting shear layer of an outer recirculation zone of the combustion process;
   a bluffbody to mix the combustion constituents, anchor the central recirculation zone and provide a flame anchor for the combustion process; and
   an ignition system positioned within the bluffbody for sustaining a combustion process between the first combustion constituent and the second combustion constituent.

26. A single-stage hypersonic vehicle having a low-speed propulsion system and a high-speed propulsion system, the single-stage vehicle comprising:
   a low-speed propulsion system for propelling the single-stage vehicle to a threshold velocity to allow takeover by the high-speed propulsion system; the low-speed propulsion system including:
      a variable inlet duct;
      a gas turbine engine downstream of said low-speed variable inlet duct;
      an afterburner downstream of said gas turbine engine; and
      a ramjet in communication with said variable inlet duct, said ramjet separated from said gas turbine engine by a flowpath divider variable inlet duct;
      a swirl generator downstream of said ramjet, said swirl generator including:
         a centerbody;
         a vane pack with a multiple of swirl vanes which support said centerbody, said swirl vanes variable between an aligned position and a skewed position; and
         a fuel injector within said centerbody; and
      a low-speed variable exit nozzle downstream of said swirl generator;
   a high-speed propulsion system including a hypersonic engine operable at the threshold velocity or above.

27. The single-stage vehicle of claim 26 wherein the swirl generator further comprising a bluffbody downstream of said centerbody.

28. The single-stage vehicle of claim 27 wherein said bluffbody defines a channeled flare at a trailing edge of said centerbody.

29. The single-stage vehicle of claim 28 further comprising a fuel injector within said bluffbody.

30. The single-stage vehicle of claim 28 further comprising a fuel injector within said vane pack.

31. The single-stage vehicle of claim 28 further comprising an igniter within said bluffbody.

32. The single-stage vehicle of claim 26 wherein the hypersonic engine comprises:
   a high-speed variable inlet duct;
   an isolator downstream of said high-speed variable inlet duct;
   a supersonic combustor downstream of said isolator; and
   a high-speed variable exhaust nozzle downstream of said supersonic combustor.

* * * * *